US011254210B2

United States Patent
Hélot (10) Patent No.: US 11,254,210 B2
(45) Date of Patent: Feb. 22, 2022

(54) OPERATOR CONTROL AND DISPLAY DEVICE FOR A MOTOR VEHICLE, METHOD FOR OPERATING AN OPERATOR CONTROL AND DISPLAY DEVICE FOR A MOTOR VEHICLE AND MOTOR VEHICLE HAVING AN OPERATOR CONTROL AND DISPLAY DEVICE

(71) Applicant: AUDI AG, Ingolstadt (DE)

(72) Inventor: Jacques Hélot, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 414 days.

(21) Appl. No.: 16/314,014

(22) PCT Filed: May 4, 2017

(86) PCT No.: PCT/EP2017/060659
§ 371 (c)(1),
(2) Date: Dec. 28, 2018

(87) PCT Pub. No.: WO2018/001605
PCT Pub. Date: Jan. 4, 2018

(65) Prior Publication Data
US 2021/0070172 A1 Mar. 11, 2021

(30) Foreign Application Priority Data
Jun. 30, 2016 (DE) .......................... 102016007995.9

(51) Int. Cl.
*B60K 35/00* (2006.01)
*B60K 37/06* (2006.01)

(52) U.S. Cl.
CPC .............. *B60K 35/00* (2013.01); *B60K 37/06* (2013.01); *B60K 2370/141* (2019.05);
(Continued)

(58) Field of Classification Search
CPC combination set(s) only.
See application file for complete search history.

(56) References Cited

U.S. PATENT DOCUMENTS 5,900,599 A * 5/1999 Ohashi ................... H01H 13/84
200/5 A
6,437,774 B1 * 8/2002 Tsuji ...................... G06F 1/1601
345/156

(Continued)

FOREIGN PATENT DOCUMENTS

DE 102005036624 A1 2/2007
DE 102007027229 A1 12/2008
(Continued)

OTHER PUBLICATIONS

International Search Report for PCT/EP2017/060659 dated Sep. 14, 2017.
(Continued)

*Primary Examiner* — Christopher E Leiby
(74) *Attorney, Agent, or Firm* — Staas & Halsey LLP (57) ABSTRACT

A proximity-sensitive and touch-sensitive screen includes a display area with first and second segments, the second segment arranged on the first segment along a contact line, on an operator control and display device. At least the second segment can be pivoted, along the contact line, with respect to the first segment to temporarily form an operator control element, thereby providing easier and more reliable operator control.

9 Claims, 3 Drawing Sheets

(52) U.S. Cl.
CPC ... *B60K 2370/1438* (2019.05); *B60K 2370/158* (2019.05); *B60K 2370/1533* (2019.05); *B60K 2370/67* (2019.05)

(56) References Cited

U.S. PATENT DOCUMENTS

| | | | | |
|---|---|---|---|---|
| 6,498,614 | B1* | 12/2002 | Amari | B60R 11/02 345/168 |
| 7,375,721 | B2 | 5/2008 | Muyskens | G06F 3/0202 345/168 |
| 9,483,124 | B2* | 11/2016 | Okabe | H01H 13/7057 |
| 2005/0110762 | A1* | 5/2005 | Muyskens | G06F 3/0202 345/170 |
| 2009/0250267 | A1* | 10/2009 | Heubel | G06F 3/04886 178/18.03 |
| 2010/0162109 | A1* | 6/2010 | Chatterjee | G06F 3/016 715/702 |
| 2011/0234502 | A1* | 9/2011 | Yun | G06F 3/04886 345/173 |
| 2011/0304550 | A1* | 12/2011 | Romera Jolliff | G06F 3/016 345/168 |
| 2012/0013548 | A1* | 1/2012 | Choi | B60K 35/00 345/173 |
| 2013/0265221 | A1* | 10/2013 | Lee | G06F 3/038 345/156 |
| 2013/0265262 | A1* | 10/2013 | Jung | G06F 3/017 345/173 |
| 2014/0098038 | A1* | 4/2014 | Paek | G06F 1/1692 345/173 |
| 2014/0196254 | A1* | 7/2014 | Song | E05D 3/14 16/302 |
| 2014/0226275 | A1* | 8/2014 | Ko | G06F 1/1681 361/679.27 |
| 2014/0280580 | A1* | 9/2014 | Langlois | B60K 37/06 709/204 |
| 2015/0378598 | A1* | 12/2015 | Takeshi | G06F 3/016 715/773 |
| 2016/0274717 | A1* | 9/2016 | Wako | G06F 3/0488 |
| 2017/0262057 | A1* | 9/2017 | Knittl | G06F 3/016 |
| 2021/0116961 | A1* | 4/2021 | Zadesky | G06F 3/0488 |

FOREIGN PATENT DOCUMENTS

| | | |
|---|---|---|
| DE | 102008004970 A1 | 7/2009 |
| DE | 102010013843 A1 | 10/2011 |
| DE | 102012010679 A1 | 12/2013 |
| DE | 102012216289 A1 | 5/2014 |
| DE | 102014016328 B3 | 3/2016 |
| DE | 102014016323 A1 | 5/2016 |
| DE | 102016007995.9 | 6/2016 |
| EP | 2 192 750 A2 | 6/2010 |
| WO | PCT/EP2017/060659 | 5/2017 |

OTHER PUBLICATIONS

German Office Action for Application No. 10 2016 007 995.9 dated Mar. 21, 2017.

English Translation by WIPO dated Jan. 10, 2019 of the International Preliminary Report on Patentability in corresponding International Patent Application No. PCT/EP2017/060659.

\* cited by examiner

OPERATOR CONTROL AND DISPLAY DEVICE FOR A MOTOR VEHICLE, METHOD FOR OPERATING AN OPERATOR CONTROL AND DISPLAY DEVICE FOR A MOTOR VEHICLE AND MOTOR VEHICLE HAVING AN OPERATOR CONTROL AND DISPLAY DEVICE

CROSS REFERENCE TO RELATED APPLICATIONS

This application is the U.S. national stage of International Application No. PCT/EP2017/060659, filed May 4, 2017, and claims the benefit thereof. The International Application claims the benefit of German Application No. 10 2016 007 995.9 filed on Jun. 30, 2016, both applications are incorporated by reference herein in their entirety.

BACKGROUND

Described below are an operator control and display device for a motor vehicle, a method for operating an operator control and display device for a motor vehicle and a motor vehicle having an operator control and display device.

Proximity-sensitive and/or touch-sensitive screens, which are subsequently referred to as touchscreens, are known from the related art in a wide range of embodiments including as a constituent part of respective operator control and display devices. In this context, resistive, capacitive or inductive operating principles can, for example, be employed and optionally also combined with one another.

EP 2 192 750 A2 describes a mobile terminal having a flexible display and a method for operating such a mobile terminal. The display or display module can in this case receive touch inputs, wherein a sensitivity of a bent or folded region of the display can be set depending on a direction or a degree of the bending. The display can, for example, be able to be rolled up or else have a plurality of folding lines.

DE 10 2012 216 289 A1 describes a method for providing an input option on a touch-sensitive surface, in particular a touch-sensitive display surface, wherein the surface has a ridge, on both sides of which a respective region of the surface is located. In this case, a movement of a finger of a user along the ridge continuously touching the ridge is detected and a value is output based thereon. The ridge can protrude from the surface or project into the surface, wherein a kink in the surface can also be understood as a ridge. A device with the touch-sensitive surface can be installed, for example, in the central console of a motor vehicle. The aim is to provide a method that can be used to provide inputs without visual monitoring or control.

SUMMARY

Described below are an operator control and display device for a motor vehicle and a method for operating an operator control and display device, which make easier and more reliable operator control possible. Furthermore, a motor vehicle having such an operator control and display device is described.

The operator control and display device has a proximity-sensitive and touch-sensitive screen (touchscreen), which part includes a display area having a first segment and a second segment arranged thereon along a contact line. Provision may be made for at least the second segment to be able to be pivoted along the contact line with respect to the first segment in order to temporarily form an operator control element. This provides easier and more reliable operator control of the operator control and display device possible.

For illustrative purposes, the touchscreen can thus include, for example, two partial screens, which correspond to the two segments. The second partial screen—corresponding here to the second segment—can then be tilted or folded, for instance, so that it encloses an angle with the first partial screen—corresponding here to the first segment. The two partial screens touch one another at the contact line.

In other words, the display region provided for presenting information, that is to say a corresponding display face of the touchscreen, is thus divided or subdivided into a plurality of segments or subregions, of which at least one—specifically in this case the second segment—is mounted or held in a pivotable manner, that is to say in a movable manner. In particular, however, a plurality of or all of the segments of the touchscreen or of the display area can also be able to be pivoted and/or able to be tilted, in particular each independently of one another as well.

The contact line is to be understood here as a linear area in which the first segment and the second segment touch one another, in particular in a non-pivoted state. Accordingly, a respective contact line can also be associated in each case with two arbitrary or other segments of the touchscreen or of the display area arranged so as to adjoin one another. Pivoting along the contact line can in this case mean that an axis of a corresponding pivoting movement extends along the contact line. However, the axis of the pivoting movement can also be arranged at a distance from and parallel to the contact line, wherein an area of the respective pivotable segment arranged on the contact line and/or facing the contact line is then moved and/or deflected to the maximum upon a respective pivoting. Pivoting of at least one segment thus leads in any case to a main extension plane of the pivoted segment and a main extension plane of a non-pivoted remainder of the display area enclosing an angle different from 0° and from 180°. In a non-pivoted state, all the segments of the display area extend in the same main extension plane.

A temporary formation of an operator control element is to be understood here to mean that an arrangement or geometry different from a state without pivoting is produced through the pivoting at least of the second segment. The geometry is particularly suitable as an operator control element for operator control of the operator control and display device. In this case, however, the geometry is provided only during the limited time period between the pivoting and return pivoting into a starting position of at least the second segment. In this starting position, the second segment is then not pivoted with respect to the first segment. In particular, the starting position is given in a starting state, in which all of the pivotable segments are arranged in their respective starting positions, that is to say are not pivoted. For example, after the corresponding operator control action has ended or when it is no longer detected that the touchscreen is being touched and/or that an object or finger used for the operator control is present, the starting position of the second segment or the starting state can be established again.

An appropriate elasticity of the segment itself and/or of a bearing or a holder of the segment and/or an appropriate, in particular mechanical, pretensioning device, for example, can serve to move the pivoted second segment back into the starting position again. However, a spring element can also be provided, for example, by way of which the second segment can be spring-loaded. Appropriate spring elements can also be provided for some or all of the respectively pivotable segments.

Owing to the ability of at least one segment of the display area to pivot with respect to another segment or the rest of the display area, an adjustable geometry of the display area or of the touchscreen can advantageously be realized. It is thus possible to achieve an advantageous synergy between the touchscreen or the physical geometry or design thereof and respective information or content presented on the touchscreen. Improved ergonomics of the operator control and display device and of the operator control thereof are thus produced overall. Specifically in a motor vehicle, the operator control of the touchscreen often takes place by way of a posture or position of an arm, for example by way of an at least approximately outstretched arm, and under conditions, for example with vibrations and jolts occurring during travel, which make it difficult to position an object or a finger reliably and precisely for the operator control of the operator control and display device. By pivoting at least one segment of the display area, assistance, support and/or guidance of the finger to the, that is to say, in particular, during the operator control, can be made possible, as a result of which a simpler and more reliable operability is produced. Since in addition an orientation based on tactile sense with respect to a position is made possible or at least assisted by way of the design of the display area caused by the pivoting, which design is no longer uniformly flat or planar, the safety during travel can be increased since the respective operator, who may be, in particular, a driver of the motor vehicle, does not have to look away from the surrounding traffic situation for the operator control and possibly disadvantageous faulty operation can be prevented.

For a construction of the display area composed of a plurality of segments, it is advantageous when the individual segments do not have a frame or at least are only surrounded by a frame that is thin or narrow enough not to interfere with a presentation of information or content, in particular over a plurality of segments, and an ability to recognize a corresponding presentation.

In a further refinement, there may be provision, when an approach of an object, in particular a finger of an operator, toward the touchscreen is detected by the touchscreen, for the second segment to be able to be pivoted automatically along the contact line with respect to the first segment. In other words, the operator control and display device thus also provides for pivoting or moving at least the second segment, in particular, however, for individually pivoting all of the segments provided for pivoting and correspondingly held or mounted. For example, electric drives, electric motors, piezoelectric and/or micromechanical components or the like can perform the pivoting or moving. In particular, the pivoting is therefore possible without the help of an operator. If the touchscreen is not proximity-sensitive and/or an object whose approach cannot be detected is used for the operator control, an automatic pivoting of the second segment can also be provided and take place when touch is detected. Through the automatic pivoting, firstly, a particularly high level of operator control comfort is advantageously achieved. Secondly, through the pivoting that already takes place upon an approach, support, that is to say improved guiding of the object or finger used for the operator control is advantageously provided directly and without delay when the touchscreen is actually touched. Owing to the availability or provision of this assistance, slipping and possibly unintentional operator control or faulty operation can be prevented, for example.

In accordance with a further embodiment, provision may be made for both the first and the second segment to be able to be pivoted and to together form a key, for the activation of which the contact line—or in other words respective areas arranged on the contact line—of the first and the second segment can be depressed or moved perpendicularly to a main extension plane of the display area of the touchscreen. In other words, the respective pivot axes of the first and the second segment are thus arranged parallel here to the common contact line. The pivot axes can be arranged, for example, on a respective edge of the first segment and of the second segment, which edge is located opposite the contact line. However, an arrangement of the pivot axes, for example, in a respective central area of the first and the second segment can also be provided so that a respective pivoting or tilting is carried out similarly to a movement of a seesaw. Since the segments are perceptibly depressed or moved due to muscular strength during operator control, the operator receives haptic, that is to say tactile, feedback or confirmation about the completed or successful operator control or activation of the key formed by the pivotable segments. A reliable blind operator control, that is to say operator control based on tactile sense, can advantageously take place without the operator having to look away and thus divert their attention from the surroundings, in particular from a surrounding traffic situation. The safety in traffic during operator control of the operator control and display device is therefore increased.

As an alternative, it is also conceivable that the key is formed by just one single pivotable segment or by a plurality of pivotable segments, in particular more than two. In this case, a superposed tilting and/or pivoting movement of the respective segments along in each case more than one contact line can also be provided. For example, four segments can be provided in a 2-by-2 arrangement, wherein each segment then has two contact lines, located perpendicular to one another, to respective other segments arranged adjacently. When the key formed in this way from the four segments is activated, a central or crossing point, in which the contact lines meet, can be able to be depressed perpendicularly to the main extension plane of the display area, for which purpose the individual segments are then accordingly mounted so as to be able to tilt and/or pivot diagonally. In other words, in this case in a pivoted state thus with respect to the display area, that is to say on the side of the display area, the segments enclose an angle of less than 180°. Reliable assistance of the object or finger wasted for operator control can advantageously be achieved as a result.

In a further refinement, provision may be made for respective display areas of the first and the second segment to enclose an obtuse angle when the second segment is pivoted with respect to the first segment. In other words, therefore, a direct and straight imaginary connecting line between the respective sides of the segments, which are actually provided for presenting information and content, can then be found. This can advantageously ensure that, in the case of by pivoting, assistance for the respective object used for the operator control is provided and therefore a particularly easy and safe operator control is possible. In addition, a good readability both of the first and of the second segment can thus be ensured. Furthermore, respective equipment for pivoting can be arranged on the pivotable segments in an easier manner and can be constructed and produced in a more cost-effective manner. In order to prevent here undesired pivoting in an opposite direction, in which the display areas would enclose a reflex angle, appropriate stop elements can be provided, for example. If automatic pivoting is provided by an electromechanical drive, for instance, the possible maximum travel thereof can be limited accordingly.

In a further refinement, provision may be made for the touchscreen to be arranged in the region of a dashboard or in the region of a central console or in a transition region between a dashboard and a central console of the motor vehicle. Such an arrangement advantageously makes a particularly flexible accessibility and readability possible in different driving situations and/or by various vehicle occupants. Moreover, when the operator control and display device is arranged in a motor vehicle, the simplified and more reliable operability, for example, in the case of vibrations and jolts occurring during travel, particularly advantageously comes into its own. In this case, in particular, a plurality of operator control and display devices and/or a plurality of touchscreens can also be arranged inside the motor vehicle. In addition or as an alternative, an operator control and display device and/or a corresponding touchscreen can be arranged, for example, also at a side of the central console, which side faces a back seat of an automobile, at a central tunnel in the region of a back seat of an automobile and/or at a rear side of a driver or front-seat passenger seat of the automobile, which rear side faces the back seat.

In a further refinement, provision may be made for the operator control and display device to have an actuator element, by which the pivotable second segment can be prompted to generate haptic feedback, in particular a vibration, independently of the pivoting thereof, directly and/or at least substantially independently of the remainder of the operator control and display device. In other words, haptic feedback that is perceptible to the respective operator can thus be generated at the second segment and this is possible in each position, that is to say in each pivoting state. The actuator element for generating the haptic feedback can be independent of and different from a pivoting mechanism for the segment. In principle, however, it is also conceivable that both the haptic feedback can be able to be generated and the segment can be able to be pivoted by the same actuator element. If the operator control and display device has a plurality of, in particular pivotable, segments, a separate actuator element can be provided for each segment. Owing to the fact that haptic feedback that is restricted to a single segment of the display area of the touchscreen can be generated in a targeted manner, more compact, lighter and possibly more cost-effective actuator elements can advantageously be used for this purpose than would be required to generate haptic feedback extending across the entire display area of the touchscreen. Haptic feedback that is at least substantially independent of the remainder of the operator control and display device is to be understood here as meaning that the haptic feedback generated at the second segment cannot be perceived or can be perceived only to a significantly reduced extent at the other segments of the display area and/or at the other components of the operator control and display device. For example, provision can be made for a mechanical vibration amplitude arising at components of the touchscreen other than the second segment due to the haptic feedback is at most 20 percent, or at most 10 percent, of the vibration amplitude arising at the second segment itself. For this purpose, vibration damping or a corresponding decoupling of the individual segments and/or components can be provided, for example.

In a further refinement, provision may be made for each of the pivotable segments of the touchscreen to be able to be pivoted by at most 25°, in particular by at most 10°. In other words, a respective pivoting movement of the individual segments is thus limited, for which purpose appropriate stop elements can be provided, for example. A mechanical stability of the operator control and display device can optionally advantageously be improved by a scope of movement of the pivotable segments limited or restricted in this way. In addition, where applicable, the occurrence of openings inside the display area and, where applicable, ingress, for example, of dust or dirt upon pivoting can be prevented or at least minimized. A stop can advantageously signal a successful operator control action and/or a travel sufficient for successful operator control to the respective operator. A short travel—corresponding to a small pivot angle—can advantageously make it possible to be able to fully carry out operator control or an operator control action particularly quickly. The respective maximum pivot angle of the individual pivotable segments can in this case be prescribed or set depending on the respective size or surface area of the segments. As a result thereof, a uniform travel or operator control path can advantageously be realized even in the case of different segment sizes. For example, a maximum travel of 300 to 500 micrometers perpendicular to the main extension plane of the display area of the touchscreen can be provided.

In the method for operating an operator control and display device for a motor vehicle, which makes simplified and more reliable operator control possible, provision is made for a piece of information to be represented graphically on a first segment of a display area of a proximity-sensitive and touch-sensitive screen (touchscreen) and/or on a second segment of the display area, which second segment is arranged along a contact line on the first segment, for an approach of an object, in particular a finger of an operator, toward the touchscreen to be detected, and, when the approach is detected by the touchscreen, for at least the second segment to be pivoted along the contact line with respect to the first segment by a drive element to temporarily form an operator control element.

A drive element can in this case include, for example, electric drives, electric motors, piezoelectric and/or micromechanical components or the like. In particular, the pivoting is therefore possible in an automatic manner, that is to say without the help of an operator.

In a further refinement of the method, provision is made for at least the second segment to be pivoted back again by a drive element into a starting position device-external assumed before the pivoting, in which starting position the first and the second segment extend in a main extension plane of the display area of the touchscreen when a removal of the object from the touchscreen is detected. The return pivoting, just like the pivoting, is therefore possible in an automatic manner, without the help of an operator, by the drive element.

The detection of a removal of the object from the touchscreen can also include in this case an end of the detection of a touch.

A motor vehicle having the operator control and display device, which includes a proximity-sensitive and touch-sensitive screen (touchscreen) having a display area having a first segment and a second segment arranged thereon along a contact line may include at least the second segment being pivoted along the contact line with respect to the first segment to temporarily form an operator control element.

In a further refinement of the motor vehicle, provision is made for the touchscreen to be arranged in the region of a dashboard or in the region of a central console or in a transition region between a dashboard and a central console of the motor vehicle. In this case, a plurality of operator control and display devices and/or touchscreens can also be arranged in the motor vehicle.

The functional designs of the operator control and display device, the method for operating the operator control and display device and the motor vehicle having the operator control and display device described previously and subsequently, as well as the corresponding advantages, can each be mutually applied analogously to the operator control and display device, the method and the motor vehicle.

BRIEF DESCRIPTION OF THE DRAWINGS

Further advantages, features and details will become more apparent and more readily appreciated from the following description of exemplary embodiments and on the basis of the drawings, of which.

DETAILED DESCRIPTION OF THE PREFERRED EMBODIMENT

Figures 1, 2, 3A, 3B:
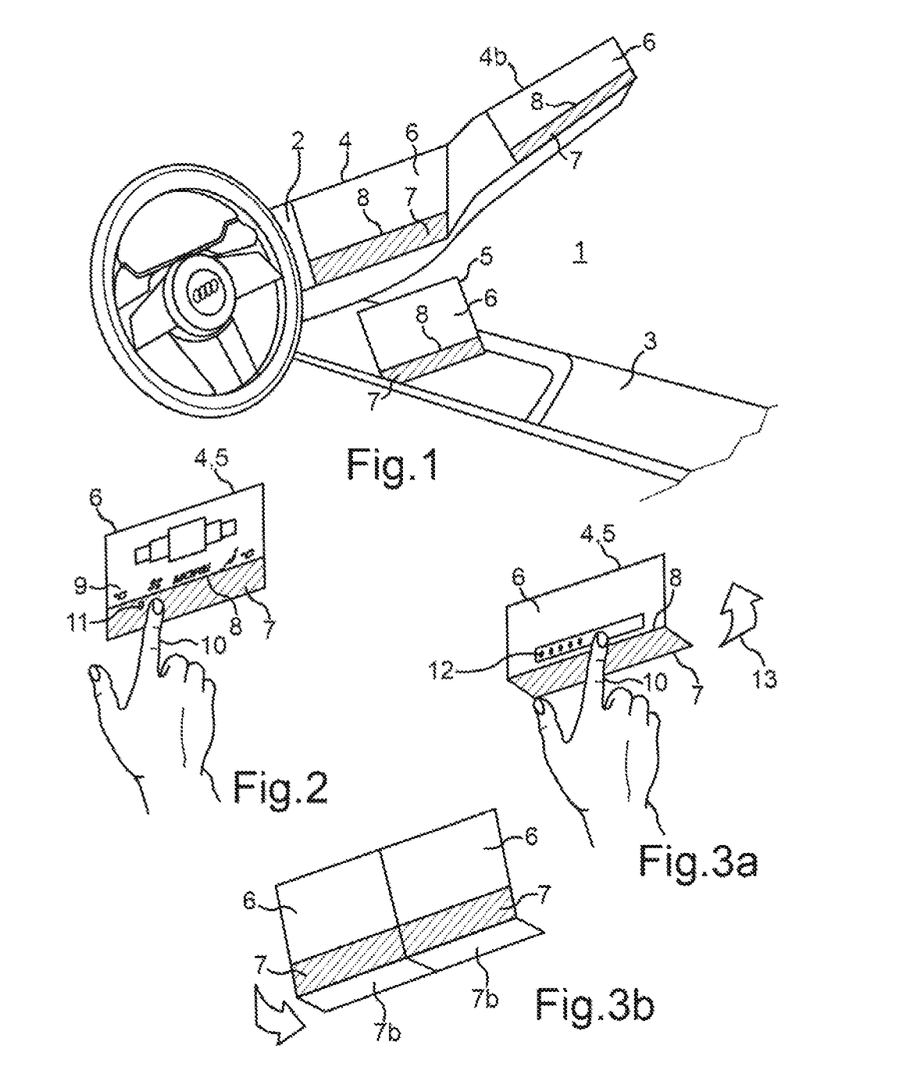
FIG. 1 is a schematic and sectional perspective view of a vehicle interior having a dashboard, a central console and respective touchscreens, arranged thereon, of respective operator control and display devices.
FIG. 2 is a schematic perspective view of a touchscreen of an operator control and display device in a non-pivoted starting position.
FIG. 3a is a schematic perspective view of the touchscreen from FIG. 2 having a pivoted second segment.
FIG. 3b is a schematic perspective view of an alternative embodiment of a touchscreen having a plurality of segments.

FIG. 1 is a schematic and sectional perspective view of a vehicle interior 1 having a dashboard 2 and a central console 3, wherein both a touchscreen 4 and a touchscreen 4b are arranged on the former and a touchscreen 5 is arranged on the latter. The touchscreens 4, 4b, 5 are part of one, a plurality of or a respective operator control and display device and are designed so as to be proximity-sensitive and touch-sensitive for this purpose. The touchscreens 4, 4b, 5 have respective display areas facing toward the vehicle interior 1 for presenting information, content, appropriate functional symbols and/or operator control elements. To this end, for example, text, graphics, symbols, geometric shapes and/or moving images or videos can be presented. Furthermore, the touchscreens 4, 4b, 5 or the display areas thereof are each subdivided in the present case into a first segment 6 and a second segment 7, which segments are arranged next to one another along a respective contact line 8. The first segment 6 and the second segment 7 may each be designed, for example, as screens or touchscreens without a frame or else surrounded by the smallest possible, that is to say thinnest or narrowest possible, frame. As a result thereof, a uniform presentation and possibility of recognizing the corresponding presentation are not impaired across the individual segments 6, 7 so that a virtually uninterrupted GUI (graphical user interface) image can be presented. In contrast to what is illustrated here, the touchscreens 4, 4b, 5 can also each be subdivided into a greater number of segments.

The touchscreen 4 is arranged in a region of the dashboard 2 that is central in the transverse direction of the vehicle and therefore may be operated and/or viewed by a driver of the vehicle, but also possibly by a front-seat passenger of the vehicle and additionally possibly also viewed by respective back-seat passengers of the vehicle. In contrast, the touchscreen 4b is arranged in a front-seat-passenger-side region of the dashboard and is therefore, for example, provided exclusively for the front-seat passenger or additionally for viewing by the driver. All of the following embodiments independent of these aspects with respect to the touchscreen 4 can also apply to the touchscreen 4b, which in each case is therefore not mentioned in addition in detail in the following text. In a corresponding manner, further touchscreens can also be arranged at a wide range of locations of the vehicle.

Previously known touchscreens are typically flat and therefore provide no physical purchase, that is to say no support or guide for objects or fingers used for the operator control. As a result thereof, precise and reliable operator control is made difficult and an orientation on the basis of tactile sense is not possible, with the result that the respective touchscreen has to be observed during operator control. From an ergonomic point of view as well as with respect to operator control comfort and operator control safety and/or safety during operator control, in particular during use in a motor vehicle, this is actually disadvantageous, for example, compared to known physically formed and shaped operator control parts with rotary keys or keys that by way of their haptics enable feedback with respect to performed operator control processes and blind operator control. However, compared to physical operator control elements, touchscreens typically have the advantage of a greater degree of flexibility with simultaneously simple and intuitive operability, since a multiplicity of different functions can be controlled using the same operator control movements, for example, owing to corresponding presentations of various operator control elements.

In order to combine the advantages of touchscreens and physically formed operator control elements, provision is made for the second segment 7 to be able to be pivoted along the contact line 8 with respect to the first segment 6 in order to temporarily form an operator control element. By pivoting the second segment 7, a previously uniformly flat geometry of the display area is changed, as a result of which blind operator control without visual support, an orientation with respect to a position in the region of the touchscreen 4, 5 and assistance, support and/or guidance of an object or finger 10 used for the operator control (see FIG. 2 ff.) can be made possible and ensured. In order to furthermore be able to output haptic feedback for operator control processes, in the present case an actuator element is provided at the second segment 7 to generate such haptic feedback, in particular in the form of a vibration. Corresponding actuator elements can also be provided at a plurality of or all of the other segments of the touchscreen 4, 5, in particular when more than the two segments illustrated here are provided. In this case, respective haptic feedback may be limited to one individual segment 6, 7.

After an operator control action, the second segment 7 can be pivoted back into the illustrated starting position, in which the touchscreen has a uniformly flat geometry across the first segment 6 and the second segment 7. The pivoting and the return pivoting of the second segment 7 can in this case be carried out, for example, by a corresponding electric drive and, in particular, automatically. In this way, a uniformly flat surface and therefore also display face of the touchscreen 4, 5 for an optimum display, presentation and recognizability and readability of respective information is advantageously provided without additional operator control outlay on the part of a respective operator, in each case before and after an operator control action, that is to say before pivoting of the second segment 7 out of the illustrated flat starting position and after the return pivoting of the second segment 7 into the starting position. As an alternative, the pivoting of the segments 6 and 7 or the pivoting of one of the segments 6, 7 with respect to the other can also be effected by an operator control force, for example a by way of a finger 10 (cf. FIG. 2 ff) on the touchscreen 4, 5. A spring element can be provided for the return pivoting, for example.

FIG. 2 shows a schematic perspective illustration of the touchscreen 4 and/or the touchscreen 5 from FIG. 1 likewise in the flat starting position, in which the first segment 6 and the non-pivoted second segment 7 are arranged in a common main extension plane. Furthermore, a hand with a finger 10 of an operator when approaching the touchscreen 4, 5, which approach is indicated by an arrow 11, is schematically illustrated. In the present case, a plurality of functional symbols 9, which may be operator control surfaces associated with respectively different functions or operator control processes, are illustrated in the first segment 6 along the contact line 8. In this case, various menu points or functional symbols can be illustrated, for example, depending on a selected functionality and/or menu level or depending on a functionality and/or menu level activated by a previous operator control action, which various menu points or functional symbols can each be selected and/or activated by a corresponding touch.

Not only generally an approach of the finger 10 toward the touchscreen 4, 5 but also a specific location or a specific position toward which the finger 10 is approaching may be detected in connection with and/or depending on an operator control face presented there or a functional symbol 9 presented there. The second segment 7—that is to say also a determined pivotable segment when a plurality of pivotable segments are provided—can then be pivoted depending on the respective functional symbol 9 toward which the finger 10 is approaching. Furthermore, a correspondingly adapted operator control field or functional symbol can possibly already be presented selectively on the first segment 6 and/or on the second segment 7 depending on the respective functional symbol 9 toward which the finger 10 is approaching.

FIG. 3a shows a schematic perspective view of the touchscreen 4, 5 from FIG. 2, wherein the second segment 7 is now pivoted with respect to the first segment 6, which is additionally indicated by a corresponding arrow 13. Furthermore, the finger 10 now touches the display area. According to a functionality associated with the functional symbol 9 toward which the finger 10 has approached, a slider 12, which is particularly suitable for the operator control or the adjustment of the functionality, is now presented on the first segment 6 along the contact line 8. Such a slider can advantageously make it possible to particularly easily and rapidly adjust or set a value of a specific function and/or functionality by virtue of the finger 10 being guided along or moved along the touchscreen 4, 5 in the region of the slider. In particular, in the case of large adjustment ranges and/or many settable intermediate stages or intermediate values, the slider 12 permits faster operator control than otherwise, for example, provided plus and minus keys that could be used to increase or decrease the corresponding value, for example, by a respective intermediate stage.

Specifically during operator control of the slider 12, the pivoted second segment 7 now offers particularly advantageous assistance and guidance for the finger 10. The pivoting of the second segment 7 produces a kink or a fold in the previously uniformly flat display area of the touchscreen 4, 5, as a result of which the finger 10 cannot slip away or slip off unintentionally or randomly along the display area during the operator control action.

FIG. 3b shows a schematic perspective view of an alternative embodiment of a touchscreen having a plurality of segments 6 and 7. In addition, a respective additional segment 7b is arranged at the second segments 7. The additional segments 7b are each pivotable here with respect to the associated second segments 7, similarly to as is described for the second segments 7 with respect to the first segments 6. In this arrangement, both the second segments 7 and the additional segments 7b can be pivotable. The additional segments 7b can likewise have respective display areas, but they can also alternatively serve as assistance or support without a display functionality and thus facilitate respective operator control actions at the segments 6, 7. This advantageously prevents faulty operation by simultaneously touching, for example, a segment 6 or 7 and an additional segment 7b. In principle, the additional segments can then also be formed to be more robust than the segments 6, 7 equipped with a display functionality, for instance, and/or serve as a shelf for small objects or the like, for instance. Similar or corresponding additional segments 7b can also be arranged in all other embodiments and there too at respectively different positions, for example also at a respective first segment 6.

Figure 4:
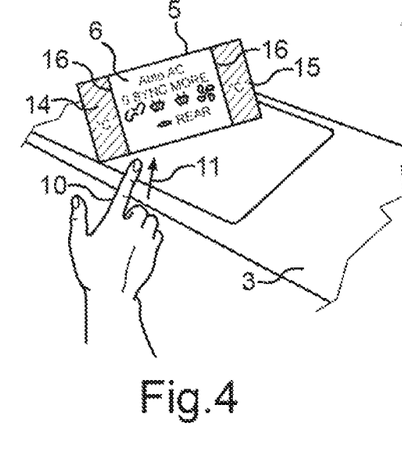
FIG. 4 is a schematic perspective view of a central console and a touchscreen, arranged thereon, of an operator control and display device having two pivotable segments.

FIG. 4 shows a schematic perspective view of a central console 3 of a motor vehicle having a touchscreen 5 arranged thereon and a hand with a finger 10 of an operator, which approaches the touchscreen 5—as illustrated by an arrow 11. In the embodiment of the touchscreen 5 illustrated here, the display area thereof is subdivided into a first segment 6 and two side segments 14, 15 arranged on opposite sides of the first segment 6. In the present case, the two side segments 14, 15 can be pivoted here along their respective contact lines 16 to the first segment 6 with respect thereto.

Figure 5:
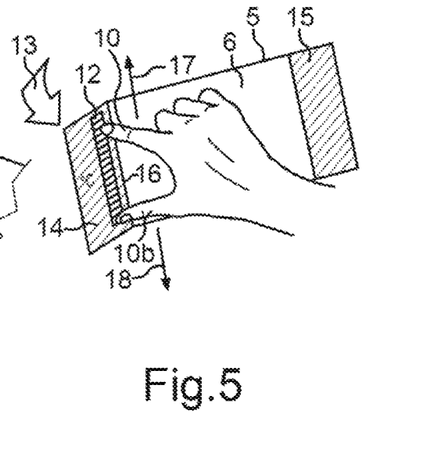
FIG. 5 is a schematic perspective view of the touchscreen of the operator control and display device from FIG. 4 having a pivoted segment.

FIG. 5 shows a schematic perspective view of the touchscreen 5 from FIG. 4, wherein the approach of the finger 10 is now completed and accordingly the side segment 14 is pivoted with respect to the first segment—as illustrated by an arrow 13. In the present case, a slider 12 extending at least in regions along the contact line 16 of the side segment 14 and of the first segment 6 is presented on the pivoted side segment 14.

The slider 12 can—like the remainder of the display area—be provided for multi-finger operator control, that is to say operator control using a plurality of fingers or contact points. This also applies to all of the other embodiments. Here, simultaneous operator control by two fingers 10, 10b is accordingly illustrated, which fingers can be moved, for example, in opposite directions along the slider 12 along the side segment 14, as is indicated by corresponding arrows 17, 18. It can be easily seen here that only the side segment 14 but not the side segment 15 is pivoted with respect to the first segment 6, since the finger 10 or the fingers 10 and 10*b* has/have approached the side segment 14 or an operator control field or functional symbol associated with the side segment 14.

As an alternative to the previously illustrated embodiments, a plurality of pivotable segments can also be arranged in a manner directly adjoining one another. In this case, in principle, an automatic and/or coordinated pivoting ability of a plurality of segments is also possible. This means that—in particular optionally also depending on a selected or activated functionality—a plurality of pivotable segments are pivoted automatically when the object or the finger 10 and/or 10*b* approaches just one specific segment or subregion of the display area and/or touches just one specific segment or a specific subregion of the display area.

Figure 6:
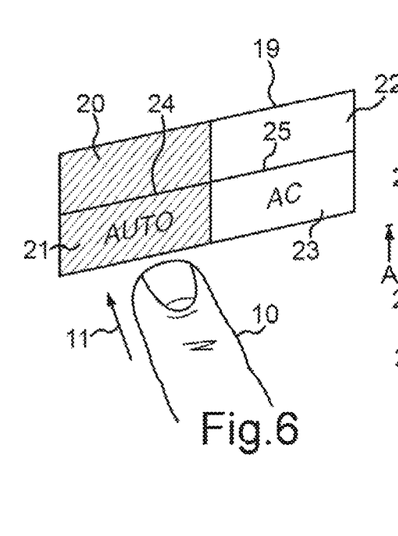
FIG. 6 is a schematic perspective view of a subregion of a touchscreen, which subregion is composed of four segments.

FIG. 6 shows a schematic perspective view of a subregion of a touchscreen 19 having in the present case four rectangular segments 20, 21, 22, 23 arranged in a 2-by-2 arrangement on one another. Furthermore, the finger 10 is also illustrated here, the approach of which toward the touchscreen 19 is indicated again by the arrow 11. The segments 20 and 21 adjoin one another along a contact line 24, whereas the segments 22 and 23 adjoin one another along a contact line 25. In the present case, provision is made for the segments 20, 21 to form a first key and for the segments 22, 23 to form a second key. The respective keys can in this case be activated by pressing on or by depressing the respective contact line 25, 26, as is illustrated in a schematic perspective view in FIG. 7 for the first key formed from the segments 20 and 21. As indicated by corresponding arrows 26, 27 the first key is activated here by the finger 10 by pressing in a direction extending perpendicularly to the main extension plane of the touchscreen 19. The main extension plane of the touchscreen 19 corresponding here to the main extension plane of the segments 22, 23 and that of the segments 20, 21 in the non-depressed or non-activated state thereof illustrated in FIG. 6.

Figure 7:
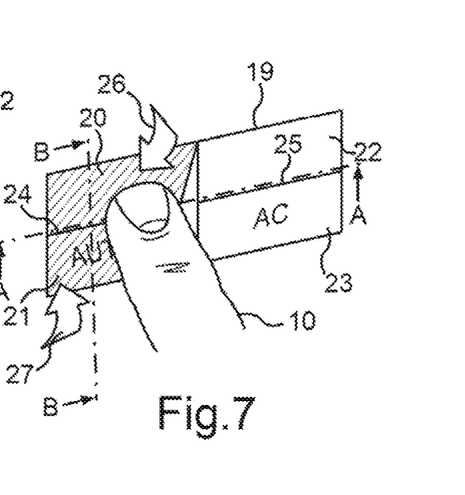
FIG. 7 is a schematic perspective view of the subregion of a touchscreen from FIG. 6 having two pivoted segments forming a key.

Since the segments 20, 21 are mounted in a pivotable manner independently of the segments 22, 23, the latter remain in their starting position in the activation illustrated here. The segments 20, 21 can possibly be connected to one another along their contact line 24, in particular in a flexible manner, that is to say with a flexible material or element. A correspondingly flexible mounting of the segments 20, 21 can likewise possibly be provided. However, an independent pivoting ability of the segments 20, 21 or another coupling can also be provided. It is conceivable here for the key formed by the segments 20, 21 to be pivoted in the manner illustrated, even when, for example, only one of the segments 20, 21 is activated, that is to say, for example, has a corresponding force applied to it by the finger 10. If the finger 10 is removed again from the touchscreen 19 and therefore no longer exerts a force or a pressure on the segments 20, 21 and hence also on the contact line 24, the segments 20, 21 can be pivoted back automatically again into their starting position illustrated in FIG. 6, for example by one or a respective spring element, which is arranged, for example, on a side of the segments 20, 21 that faces away from the display area and is not illustrated here.

In the embodiment illustrated in FIGS. 6 and 7 having segments 20, 21 and 22, 23, respectively, that can be pivoted in the form of a key by manual activation, for example, an electric drive that provides automatic pivoting when an object or the finger 10 approaches can possibly be omitted. In the context of a greater degree of flexibility, it is also conceivable, however, for both an automatic and a manual pivoting ability to be possible. An actuator element for generating haptic feedback, in particular in the form of a vibration, can also be provided here for each of the segments 20, 21, 22, 23 or, for example, for each key formed from for example in each case two segments 20, 21 and 22, 23, respectively.

Figure 8:
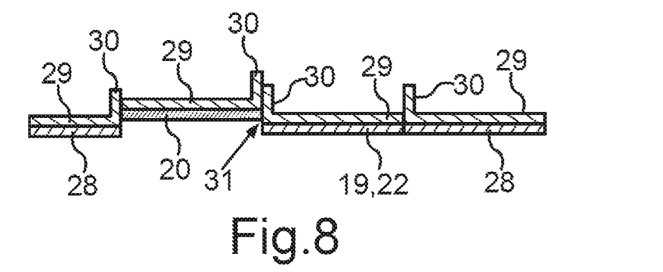
FIG. 8 is a schematic sectional view of a touchscreen corresponding to a view along the section A-A from FIG. 7.

FIG. 8 shows a schematic sectional view of the touchscreen 19, which corresponds at least substantially to a section A-A in FIG. 7. In addition to the segments 20, 22, segments 28 each adjoining the segments laterally are illustrated here. All of the segments 20, 21, 22, 23, 28 of the touchscreen 19 can be provided with a respective fixed carrier segment 29. The carrier segments 29 are in this case arranged on a side of the segments 20, 22, 28, which side faces away from a user, that is to say also away from a respective display face of the touchscreen 19, and therefore also have to be non-transparent, for example. In the present case, each of the carrier segments 29 has a wall element 30 arranged perpendicularly to a main extension plane of the respective segment 20, 22, 29. The wall elements 20 are arranged here on an edge of the respective segment 20, 22, 28 and/or at a respective contact line between two segments 20, 22, 28. By way of the wall elements 30, an otherwise occurring gap between two segments 20, 22, 28 arranged next to one another or on one another during pivoting of a segment 20, 22, 28 can advantageously be covered. Without the wall elements 30, such a gap could open up, for example, in a region 31 between the segment 20 and the segment 22 adjoining same during activation of a key formed inter alia by the segment 20. By covering such gaps, a design and impression can be improved and configured in a more high-grade manner. Furthermore, damage due to ingress of objects, dust, dirt, moisture or the like through a corresponding gap is prevented.

Figure 9:
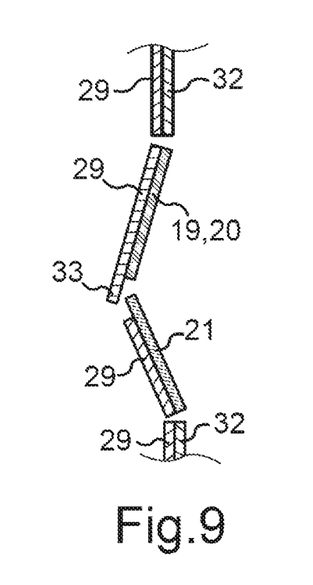
FIG. 9 is a schematic sectional view of a touchscreen corresponding to a view along the section B-B form FIG. 7.

FIG. 9 shows a schematic sectional view of the touchscreen 19, which corresponds at least substantially to a section B-B in FIG. 7. In this case, too, additional segments 32 of the touchscreen 19 are illustrated, illustrated, which adjoin the segments 20, 21, that is to say are arranged next to the segments. Similarly to as already illustrated in FIG. 8, here too respective carrier segments 29 are provided on the segments 20, 21, 32 on a side facing away from a user. As an alternative or in addition to the wall elements 30 illustrated in FIG. 8, the carrier segments 29 of two respective segment 20, 21, 32 arranged next to one another and/or together forming a key, for example, can be designed here to be of different length. In particular, the carrier segments 29 can have a length different from the respective extent of the associated segment 20, 21, 32 in at least one but also in two directions or dimensions spanning the respective main extension plane. Furthermore, provision is made here for the carrier segment 29 of the segment 20 to be longer than the associated segment 20 and for the carrier segment 29 of the segment 21 immediately adjacent thereto to be shorter than the segment 21. The same can apply to two respective segments 20, 21, 32 arranged next to one another or on one another and/or together forming a key or an operator control element. In the present case, an elongated region 33 of the carrier segment 29 associated with the segment 20 thus reaches beyond the segment 20 and as far as behind the segment 21. Owing to the different lengths of the carrier segments 29, a gap or opening in the touchscreen during activation, for example, in this case of the key formed from the segments 20 and 21 can advantageously be covered or an occurrence of such a gap or opening can be prevented. At the same time, the carrier segments 29 can together form a uniform and stable layer or tier or a uniform and stable background at the segments 20, 21, 32 with a respective display functionality.

Figure 10:
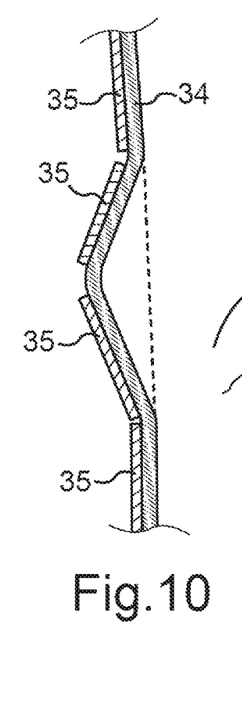
FIG. 10 is a schematic sectional view of an alternative embodiment of a touchscreen corresponding to FIG. 9.

FIG. 10 shows a schematic sectional view of an alternative embodiment of a touchscreen, wherein the view or perspective corresponds to that from FIG. 9. In the embodiment illustrated in FIG. 10, a uniform, continuous layer 34 is provided on a side facing the respective operator. In this case, it may be a flexible display element, for example based on OLED (organic light-emitting diode) technology, that is involved. A plurality of carrier segments 35 arranged on or next to one another are provided on a side of the layer 34, which side is applied to the operator. The carrier segments 35 can form a stable and fixed support for the layer 34. In particular, the carrier segments 35 can in this case be guided and/or mounted in a pivotable manner and/or be provided with respective drive elements for pivoting. By pivoting, for example, two directly adjacent carrier segments 35, the layer 34 as illustrated here can thus be deformed in a reversible manner with respect to a flat or planar starting position, which is indicated by dashes. As a result thereof, in this embodiment too, by pivoting respective segments 35, it is possible to form an operator control element that can be perceived in particular advantageously haptically, that is to say with the aid of tactile sense.

As an alternative, it can also be conceivable for the layer 34 to be designed as a transparent protective layer, whereas the carrier segments themselves then have a display functionality. In any case, the carrier segments 35 and the layer 34 can be connected to one another, for example, in an adhesively bonded manner.

Figure 11:
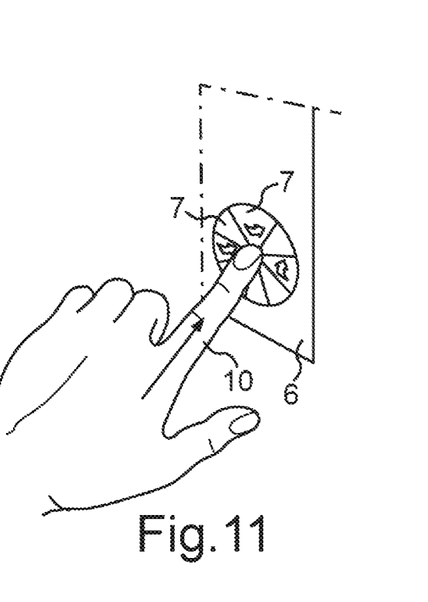
FIG. 11 is a schematic perspective view of a touchscreen having a plurality of segments in an alternative embodiment.

FIG. 11 shows a schematic perspective view of a further alternative embodiment of a touchscreen having a plurality of second segments 7 that can be pivoted with respect to a first segment 6. In the present case, the segments 7 are each shaped here in the shape of a circular sector or circular section and together form a round, that is to say a circular-area-shaped or circular-disk-shaped, operator control element. Each of the segments 7 is delimited here by two radii and a circular arc running between the radii. Here, the segments 7 thus have a wedge-like design. The respective circular arc can in this case represent a respective contact line to the first segment 6, which surrounds all the segments 7. The radii represent contact lines to respective other segments 7. No fixed or permanent contact to the first segment need be provided or exist in particular along the circular boundary of the operator control element in this case. For the operator control or activation of the operator control element formed by the segments 7, a pressure or a force can be exerted, for example by the finger 10—or else with another operator control object—on a central point of the operator control element in which all the segments 7 meet. In this case, the segments 7 are pivoted both with respect to the surrounding first segment 6 and also with respect to the respective remaining or adjoining segments 7. Regions of the segments 7 facing not only the central point but also the first segment 6 can indeed be deflected here from the main extension plane of the first segment 6. Respective drive and/or spring elements can also be provided here on the segments 7 in the manner already described.

Independently of the specific embodiment of the operator control and display device and the touchscreen 4, 5, 19, shapes, sizes and relative size ratios of the segments 6, 7, 14, 15, 20, 21, 22, 23 other than those illustrated here can also be provided. In each direction extending in the main extension plane of the respective display area, for example, an extent of 20 millimeters can be provided as the segment size. However, a segment can likewise also have, for example, a dimension of 20 millimeters by 10 millimeters, with the result that for instance a key formed from corresponding segments 20, 21 or 22, 23 can have a square shape with an edge length of 20 millimeters. This advantageously makes simple production and reliable operability possible by way of sufficiently large operator control elements. Association of a respective operator control element with a segment 6, 7, 14, 15, 20, 21, 22, 23 makes particularly simple actuation and simple and easily recognizable corresponding presentation possible. However, in principle, both virtually arbitrary shapes of individual segments and arbitrary associations of a number of segments with operator control elements or functions can be provided.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. An operator control and display device for a motor vehicle, comprising:
 a proximity-sensitive and touch-sensitive screen having a display area with a first segment and a second segment arranged thereon, the first and second segments separated by at a contact line and each having a rigid structure, at least the second segment being pivotable at the contact line relative to the first segment; and
 a controller receiving input from an operator control element formed by the second segment when pivoted at the contact line.

2. The operator control and display device as claimed in claim 1,
 wherein the proximity-sensitive and touch-sensitive screen detects approach of an object, and
 further comprising a mechanism driving the second segment automatically to pivot at the contact line relative to the first segment when the approach of the object toward the proximity-sensitive and touch-sensitive screen is detected, prior to detection of user input.

3. The operator control and display device as claimed in claim 1, wherein each of the first and second segments of the proximity-sensitive and touch-sensitive screen are pivotable by at most 25°.

4. The operator control and display device as claimed in claim 3, wherein each of the first and second segments of the proximity-sensitive and touch-sensitive screen are pivotable by at most 10°.

5. The operator control and display device as claimed in claim 1, wherein the proximity-sensitive and touch-sensitive screen has at least first and second layers, the first layer forming a continuous sheet facing a user and the second layer formed of separate carrier segments, two of the separate carrier segments corresponding to the first and second segments.

6. A method for operating an operator control and display device for a motor vehicle, having a proximity-sensitive and touch-sensitive screen with a display area having a first segment and a second segment arranged thereon and separated by a contact line, comprising:

graphically representing a piece of information on at least one of the first segment and the second segment;

detecting approach of an object toward the proximity-sensitive and touch-sensitive screen; and pivoting, prior to detection of user input as the approach of the object is detected, at least the second segment at the contact line relative to the first segment by a drive element to form an operator control element.

7. The method as claimed in claim 6, further comprising:

detecting removal of the object from the screen; and returning at least the second segment, by the drive element, back to a starting position assumed before said pivoting, the starting position having the first and second segments extending in a common main extension plane of the display area of the screen, when the removal of the object from the screen is detected.

8. A motor vehicle, comprising:

a passenger compartment;

an operator control and display device in the passenger compartment, having a proximity-sensitive and touch-sensitive screen with a display area having a first segment and a second segment separated at a contact line and each having a rigid structure; and a mechanism pivoting at least the second segment at the contact line relative to the first segment to form an operator control element.

9. The motor vehicle as claimed in claim 8, wherein the mechanism pivots at least the second segment when the operator control and display device detects approach of an object, prior to detecting user input by the proximity-sensitive and touch-sensitive screen.

* * * * *

UNITED STATES PATENT AND TRADEMARK OFFICE
CERTIFICATE OF CORRECTION

Page 1 of 1

PATENT NO. : 11,254,210 B2
APPLICATION NO. : 16/314014
DATED : February 22, 2022
INVENTOR(S) : Hélot It is certified that error appears in the above-identified patent and that said Letters Patent is hereby corrected as shown below:

In the Claims

Column 14, Line 33:
Claim 1, before "at" delete "by"

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*